United States Patent
Stockman

[11] 3,765,346
[45] Oct. 16, 1973

[54] ASH PROCESSING SYSTEM
[75] Inventor: Richard F. Stockman, Friendship, N.Y.
[73] Assignee: The Air Preheater Company Inc., Wellsville, N.Y.
[22] Filed: Mar. 30, 1972
[21] Appl. No.: 239,474

[52] U.S. Cl. .................... 110/8 R, 110/11, 110/15
[51] Int. Cl. .............................................. F23g 5/12
[58] Field of Search .................. 110/7, 8, 11, 15, 110/18

[56] References Cited
UNITED STATES PATENTS
| | | | |
|---|---|---|---|
| 3,697,256 | 10/1972 | Engle | 110/15 |
| 3,303,798 | 2/1967 | Kartinen et al. | 110/11 |
| 3,570,421 | 3/1971 | Flowers, Jr. | 110/8 |
| 3,668,077 | 6/1972 | Ban | 110/15 |
| 3,685,437 | 8/1972 | Panning | 110/8 X |

Primary Examiner—Kenneth W. Sprague
Attorney—Wayne H. Lang et al.

[57] ABSTRACT

A pyrolytic system for the conversion of waste material into its basic components. In this system ash resulting from the pyrolysis of organic waste material together with glass bottles, metal cans, foil and other non-combustible residue is compressed and baled before being introduced into a high temperature "slagging" chamber. In the "slagging" chamber the baled refuse is subjected to heat sufficient to reduce it into a molten slag and its molten metallic components, while the gaseous products of combustion are directed downward and over the surface of the hot molten residue to effect complete oxidation of their combustible components.

5 Claims, 1 Drawing Figure

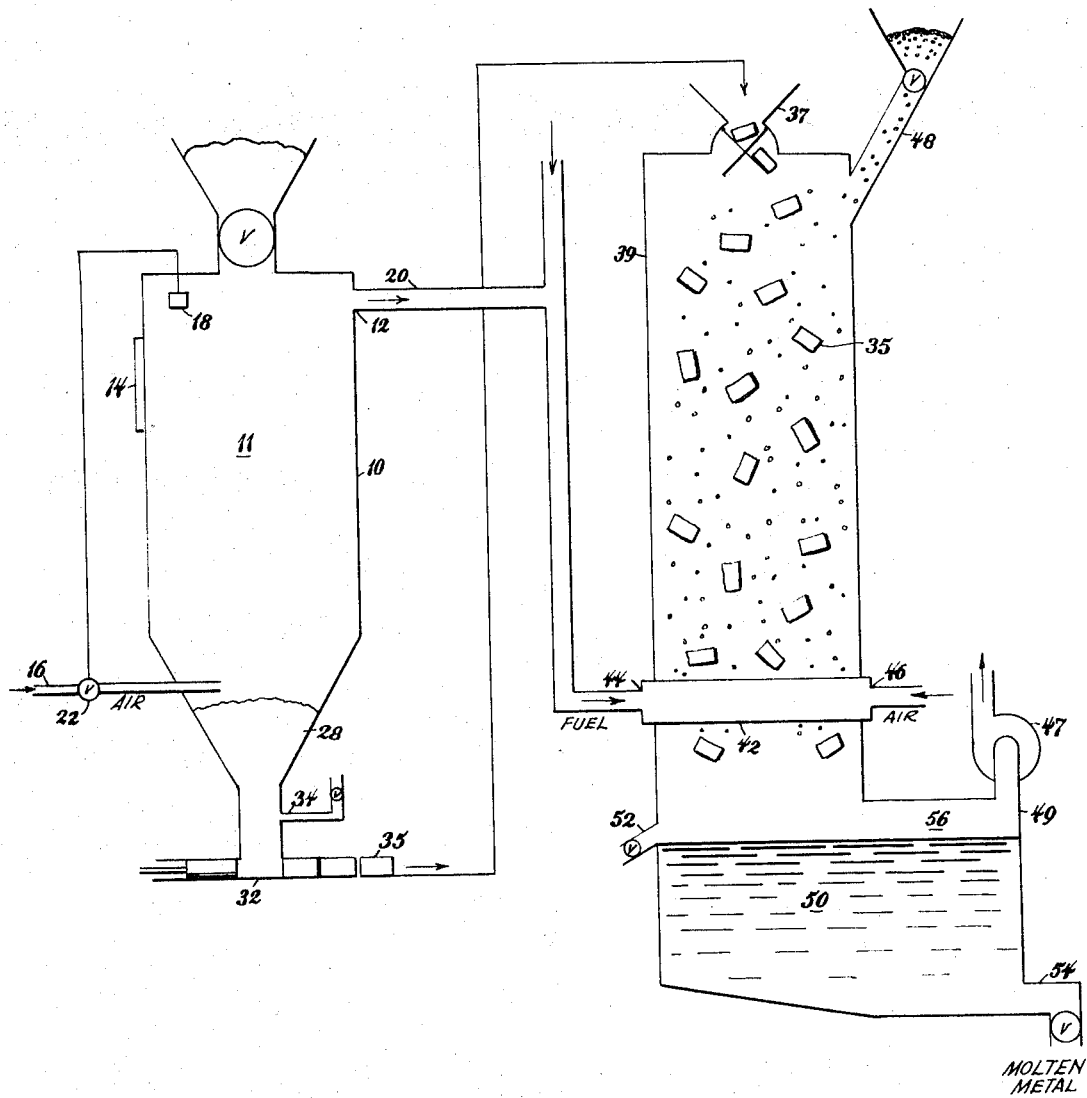

3,765,346

ASH PROCESSING SYSTEM

BACKGROUND OF THE INVENTION

1. Field of the Invention

This invention relates to apparatus for the thermal conversion of ash, bottles, cans and other non-combustible refuse to a more elemental form in order that the constituents thereof may be readily reused.

2. Description of Prior Art

It is generally known that waste materials including glass bottles and metal cans may be disposed of in high temperature "slagging" type incinerators that reduce the waste to a molten liquid more readily separated into its several components. Such incinerators eliminate sorting, grading and further treatment of all wastes because the residues therefrom are reduced to a minimum volume slag that comprises a commercially acceptable aggregate usable in road building or in other types of construction. Moreover, the molten residues may be readily separated into their basic constituents for "recycling" or reuse.

Although past devices of this type have been proven technically feasible, they have not gained wide public approval because their application is very limited. Usually, such devices are adapted to be used only as large, central disposal plants where a great mass of raw refuse and waste can be collected and reduced to its basic constituents in a single complete operation. Thus these devices are designed as large, integrated operations not to be confused with the usual small installations of the type represented by small businesses and schools now using a pyrolyzing type incinerator for the elimination of its waste material.

Such "slagging" type apparatus is well developed in the art as indicated by U. S. Pats. Nos. 3,511,195 and 3,417,717, but it is apparent that there is no intent here to further process the ash and other non-combustible waste that remains after the pyrolysis of a charge of waste in a conventional pyrolyzing type incinerator.

SUMMARY OF THE INVENTION

The present invention therefore relates to an arrangement by which the ash and other residue from a conventional "pyrolyzer" may be processed for further reduction in a "slagging" type incinerator.

The invention also relates to an arrangement by which several existing low-temperature "pyrolyzing" type incinerators in either the same locality or in various different locations may be adapted to supply their residue to a single high-temperature "slagging" type incinerator to provide the benefits of total conversion.

BRIEF DESCRIPTION OF THE DRAWING

A better understanding of my invention may be had by reference to the drawing in which the single FIGURE schematically illustrates a perferred embodiment of my system including a down draft cupola that receives combustible gas and blocks or bales of non-combustible residue from a "starved-air" type pyrolyzer.

DESCRIPTION OF THE PREFERRED EMBODIMENT

In the drawings of the present invention, the reference numeral 10 designates a combustion vessel enclosing a pyrolyzing chamber 11 having a gas exhaust port 12 and a waste loading opening with a closure 14 through which material to be disposed of is placed into the chamber.

The bottom of the combustion chamber is adapted to receive air supply conduit 16 through which air in less than stoichiometric quantities but sufficient for the partial combustion or pyrolysis of the waste is supplied in response to means such as the temperature responsive thermocouple 18 which controls valve 22 in the air supply conduit to maintain "starved-air" conditions in the chamber 11.

The same conduit 16 may be used for the selective supply of an inert gas whereby the oxidation rate within the pyrolyzing chamber 11 may be closely controlled or even stopped at any time by the injection of an inert or non-combustible gas in a predetermined amount.

The top of the pyrolyzing chamber 11 is provided with a secondary loading hopper 24 having an air lock type valve 26 in the throat thereof whereby a quantity of non-combustible refuse such as bottles and cans may be added into the combustion chamber while admitting only a limited quantity of air.

The bottom of the housing 10 is formed as a hopper 28 with a compacting cylinder 32 adapted to receive the ash and other residue from the pyrolyzing chamber and compress it into bales or blocks. Inasmuch as the residue at the bottom of chamber 11 includes dry, powder-like ash as well as metallic cans and glass bottles, an adhesive binder may be added to the ash to insure that it will compress into a block-like mass and adhere to the other solids.

The binder is added to the ash at the bottom of chamber 11 through an inlet port 34 from any suitable source not here illustrated. The binder may be formed of any combustible adhesive such as tar or bitumin, or it may be plastic or other waste material which is in itself a combustible refuse awaiting disposal.

The bales or bundles of non-combustible residue 35 are added into the top of a vertical shaft cupola 39 through a rotary valve 37 or the like and they descend by gravity to the lower portion where a bustle 42 having air and gas openings permit the addition of fuel and air through inlets 44 and 46 sufficient to maintain a slagging temperature of 2,500° to 3,500° F. The fuel is supplied from any suitable outside source and is adapted to be supplemented by combustible gas pyrolyzed in chamber 11 from the raw waste.

As the bales of residue 35 are deposited in the cupola 36, predetermined amount of limestone and coke is simultaneously added through an inlet 48 in accordance with practice standard for cupola operation.

A valved tap 52 provides an opening whereby molten slag or other impurities may be skimmed off the top of molten material 50, while the molten metallic waste is adapted to be drawn off an exhaust port 54.

Oxidized air, fuel and other products of combustion resulting from combustion in chamber 56 in the presence of limestone and non-combustible waste is directed downward over the surface of the molten residue 50 and out of exhaust opening 49 to the atmosphere. By increasing the length of chamber 56 over the molten, high temperature residue 50, the residence time of the combustion gas is increased sufficiently to provide for the complete elimination of any combustibles therein.

Inasmuch as the ash, bottles, cans and other non-combustible refuse from the pyrolyzing chamber 11 is compressed into a "cake-like" bale or block that may be readily transported, the slagging chamber or vertical shaft cupola 39 may be located at a central location far removed from the pyrolyzing incinerator. Thus, a single cupola 39 may process the baled residue from one or several incinerators of the pyrolyzing type adjacent thereto or distant therefrom.

In operation a charge of general waste material including combustibles and non-combustibles alike are loaded into chamber 11 and combustion is begun. Air flow for combustion through duct 16 is controlled by valve 22 in response to temperature determined by thermocouple 18 so that the temperature in the chamber is maintained at a suitable pyrolyzing level, usually about 1,000° F. Accordingly, pyrolyzed gases are exhausted through exhaust port 12 while the ash including glass bottles and metallic cans is allowed to build up at the bottom of the chamber. A packing cylinder 32 is actuated to compress the waste into a number of bricks or blocks 35 which are in turn fed into the loading hopper 37 of the cupola 39. A combustible binder is dispersed into the ash through inlet 34 whereby the powdery ash is bound together with the glass bottles and metal of the cans to comprise a block or residue that may be easily transported intact to the cupola inlet 37.

In the cupola the blocks of residue 35 are intermixed with a predetermined quantity of coke and limestone being added through inlet 48. Near the bottom of the cupola fuel is added through inlet 44 and air is added through inlet 46. Inasmuch as blower 47 is located in the exhaust duct 49 the products of combustion that result from combustion of fuel in the presence of the charge in cupola 39 are moved downward over the surface of the hot molten residue 50 and thence exhausted in a completely innocous state to the atmosphere.

It is evident that various changes may be made in the location and placement of the several incinerators or in their design without departing from the spirit of the invention, and it is intended that all matter contained in the above description or shown in the accompanying drawing shall be interpreted as illustrative and not in a limiting sense.

I claim:

1. A system for the total conversion of waste material comprising a first housing enclosing a pyrolyzing chamber for the pyrolysis of waste material, an inlet for waste material to be loaded into the pyrolyzing chamber, means supplying a quantity of air for the partial combustion of the waste in said pyrolyzing chamber, an exhaust port in the pyrolyzing chamber for the exhaust of gaseous products of combustion therefrom, a port in the pyrolyzing chamber for removing residual matter therefrom, a second housing enclosing an independent slagging chamber, a burner in said slagging chamber including means for admitting a supply of fuel and air thereto, a loading opening in the slagging chamber adapted to receive residual matter from the pyrolyzing chamber, and means intermediate the pyrolyzing chamber and the slagging chamber adapted to compress residual matter from the pyrolyzing chamber into a plurality of discrete bodies before it is introduced into the slagging chamber.

2. A system for the total conversion of waste material containing organic and inorganic matter comprising a housing enclosing a pyrolyzing chamber for the pyrolysis of the organic waste material, an inlet for the supply of waste material into the pyrolyzing chamber, means supplying a quantity of air to the pyrolyzing chamber, a thermocouple responsive to temperature within the pyrolyzing chamber, means regulating the air being supplied to the pyrolyzing chamber in response to the thermocouple in pyrolyzing chamber, an outlet port in said chamber for exhaust of gaseous products of combustion therefrom, an outlet port in said chamber for the exhaust of residual material therefrom, a slagging chamber, a loading opening in the slagging chamber for the introduction of residual matter from the pyrolyzing chamber, a source of heat in the slagging chamber adapted to provide heat to the slagging chamber sufficient to reduce the residual matter therein to a molten condition, means for introducing a flux to the slagging chamber, and baling means adapted to compress the residual matter from the pyrolyzing chamber into discrete blocks before it is introduced into the slagging chamber.

3. A system for the total conversion of waste material as defined in claim 2 including a source of combustible binding material and means for adding the binding material to the residual matter in advance of the baling means.

4. A system for the total conversion of waste material as defined in claim 2 wherein the slagging chamber comprises a vertical shaft housing with inlets for gas and air, and means directing gas exhausting from the pyrolyzing chamber to said gas inlet whereby the heat content of the pyrolized gas is utilized in the slagging chamber.

5. A system for the total conversion of waste material as defined in claim 2 having an inlet for combustion air in the slagging chamber sufficient to reduce the charge therein to a molten condition, an outlet for combustion gases adjacent the bottom of the slagging chamber, and means moving the gaseous products of combustion downward in the vertical slagging chamber and over the molten charge therein to subject particulate matter entrained in said combustion gas to the high temperature of the molten charge.

* * * * *